United States Patent [19]

Lemke

[11] Patent Number: 4,834,600
[45] Date of Patent: May 30, 1989

[54] FASTENER ASSEMBLY

[76] Inventor: Stuart H. Lemke, 349 River Bluff, Mosinee, Wis. 54455

[21] Appl. No.: 236,666

[22] Filed: Aug. 25, 1988

[51] Int. Cl.4 .............................................. F16B 13/06
[52] U.S. Cl. ........................................ 411/55; 411/60;
411/182; 411/908; 411/32; 52/410
[58] Field of Search ....................... 411/40, 41, 45–48,
411/55, 57, 60, 182, 907, 908, 32, 33; 52/410, 512

[56] References Cited

U.S. PATENT DOCUMENTS

| | | | |
|---|---|---|---|
| 4,114,509 | 9/1978 | Poe | 411/60 |
| 4,263,833 | 4/1981 | Loudin et al. | 411/55 |
| 4,726,722 | 2/1988 | Wollar | 411/32 |

Primary Examiner—Neill R. Wilson
Attorney, Agent, or Firm—Andrus, Sceales, Starke & Sawall

[57] ABSTRACT

A fastener assembly for securing layers of roofing material to a deck includes a nut for insertion in and engagement with a pre-drilled hole in the deck and a threaded bolt for engagement with the nut. The nut is provided with resilient legs that are disposed both above and below the hole and that deflect outwardly upon being engaged by the bolt to prevent removal of the nut from the hole. The shank of the bolt is provided with a groove that engages edge portions on the nut legs to prevent counter rotation of the bolt.

5 Claims, 3 Drawing Sheets

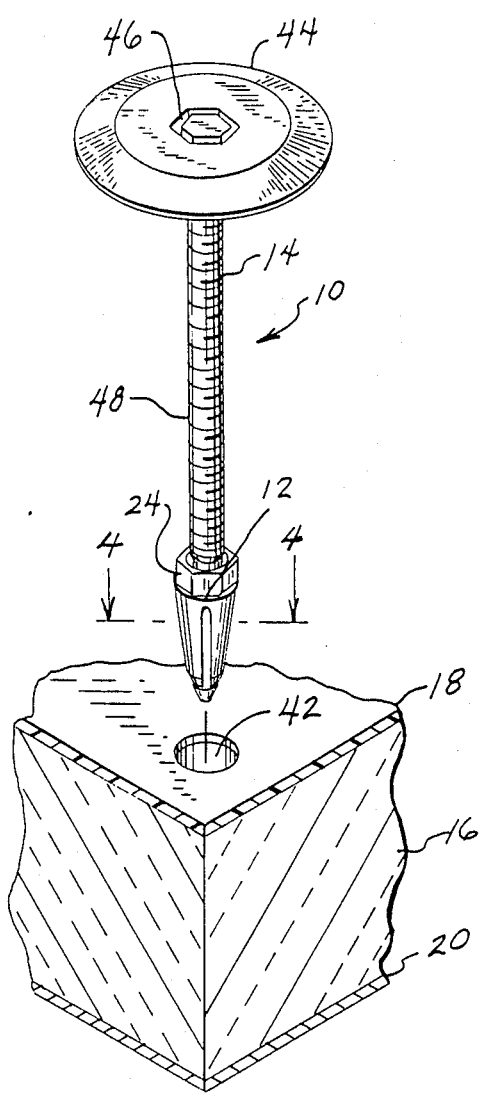
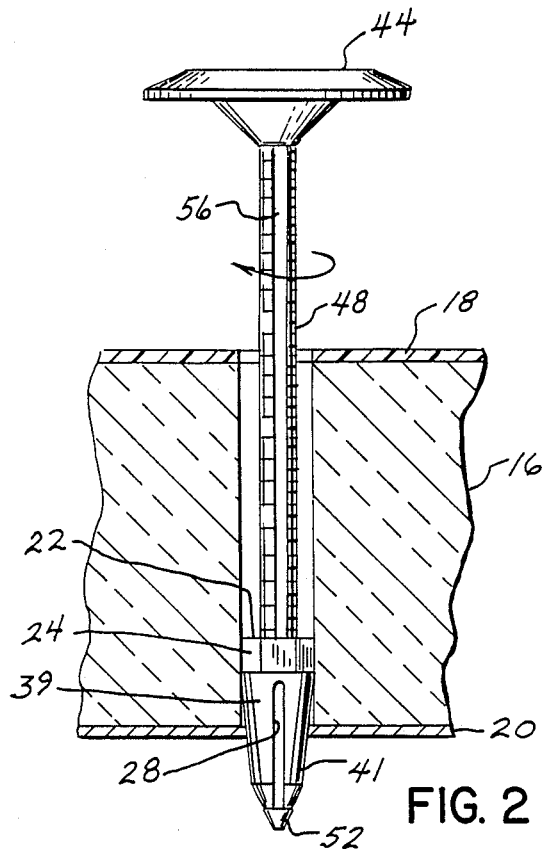
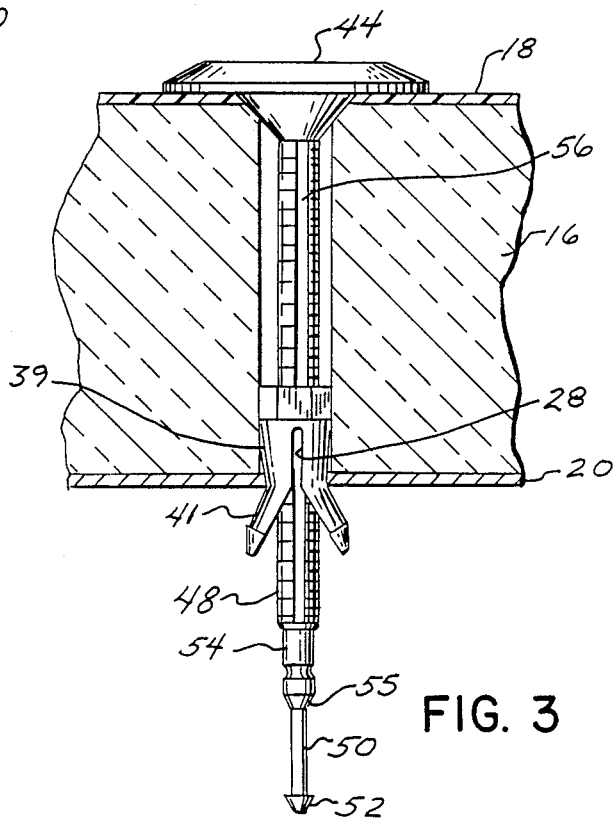
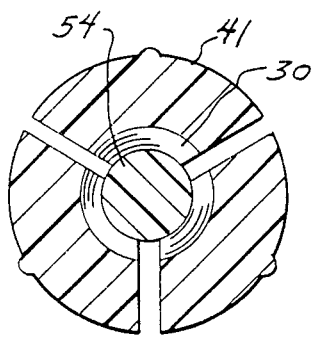
FIG. 1
FIG. 2
FIG. 3
FIG. 4

FASTENER ASSEMBLY

BACKGROUND OF THE INVENTION

The present invention relates to a fastener assembly and more particularly to a fastener assembly for securing layers of roofing material to a deck.

The roofing industry has evolved to the point where now a majority of the new roofing installations utilize a wood or metal deck to which is secured a substantially thick layer of insulation covered by a sealing roof membrane.

This type of installation requires the use of elongated noncorrosive fasteners that are able to withstand deck, insulation and membrane movement and still maintain extremely high pull out forces.

Conventional screw type fasteners have not provided the desired strength and/or pull out resistance.

SUMMARY OF THE INVENTION

A fastener assembly for securing layers of roofing material to a deck includes a nut dimensioned to fit within a pre-drilled hole in the deck material.

The nut includes a plurality of resilient legs disposed downwardly from an upper portion of the nut and which define a reduced diameter passageway for the shank of a bolt. The lower portion of the legs extend below the bottom surface of the deck while the upper portion of the legs remain above the deck surface in the insulation.

In accordance with another aspect of the invention a bolt is provided having an upper plate member for substantial surface engagement with the uppermost layer of roofing material.

In accordance with yet another aspect of the invention the bolt is provided with a threaded shank portion having a diameter greater than that of the passageway defined by the nut legs so that upon threading of the bolt into the nut and upon introduction of the shank portion into the passageway of the legs are forced outwardly and beyond the diameter of the hole to prevent rotation and upward movement of the nut out of the hole.

In accordance with still another aspect of the invention the shank portion of the nut is provided with a longitudinal groove that is engageable with the nut legs to inhibit counter rotation of the bolt out of the nut.

In accordance with yet another aspect of the invention the bolt is provided with a tip portion that extends downwardly from the shank portion of the bolt and has a length equal to or greater than that of the leg defined passageway. The tip is provided with an enlarged head that extends beyond the passageway so that the nut may be retained on the tip portion of the bolt between the enlarged head and the shank.

In accordance with yet another aspect of the invention the bolt is provided with an intermediate portion that connects the shank and tip portions of the bolt. The intermediate section is tapered so that its initial engagement with the leg defined reduced passageway causes an outward deflection of the legs so as to cause engagement of the legs with the sidewall of the hole and thus prevent rotation of the nut as the bolt is rotated into engagement with it. Further rotation of the bolt causes expansion of the upper portion of the legs which further enhances the pull out strength of the nut and bolt.

In accordance with still another aspect of the invention, the bolt is provided with a resilient gasket for the prevention on leaks in the deck.

The present invention thus provides a fastener assembly having substantially greater advantages including corrosion prevention and pull out resistance than the conventional fasteners.

The "lock tip" design allows for easier installation of the entire assembly and also allows for the removal of the fastener without losing the nut in the roofing materials.

BRIEF DESCRIPTION OF THE DRAWINGS

The drawings illustrate the best mode presently contemplated of carrying out the invention.

In the drawings:

FIG. 1 is a perspective view of a fastener assembly constructed according to the present invention and shown above a roof deck and associated roofing materials having a pre-drilled hole;

FIG. 2 is a cross-sectional view of the fastener assembly in the process of installation;

FIG. 3 is a cross-sectional view of the fastener assembly installed;

FIG. 4 is a section taken along line 4—4 of FIG. 1;

DESCRIPTION OF THE PREFERRED EMBODIMENT

Figure 5:
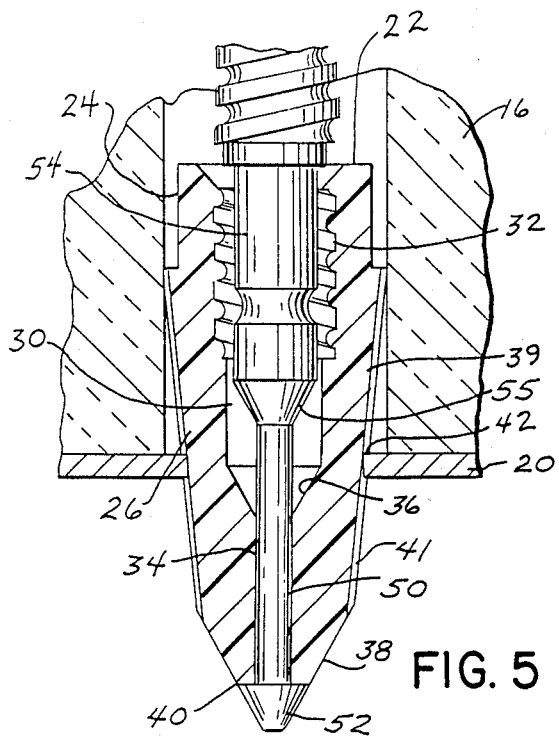
FIG. 5 is an enlarged cross-sectional view of the tip portion of the bolt and of the leg portion of the nut prior to installation.

As shown in FIG. 1, a fastener assembly 10 includes a nut 12 and a bolt 14. Fastener assembly 10 is utilized to secure layers of roofing material such as insulation 16 and waterproof member 18 to a metal deck 20.

Figure 6:
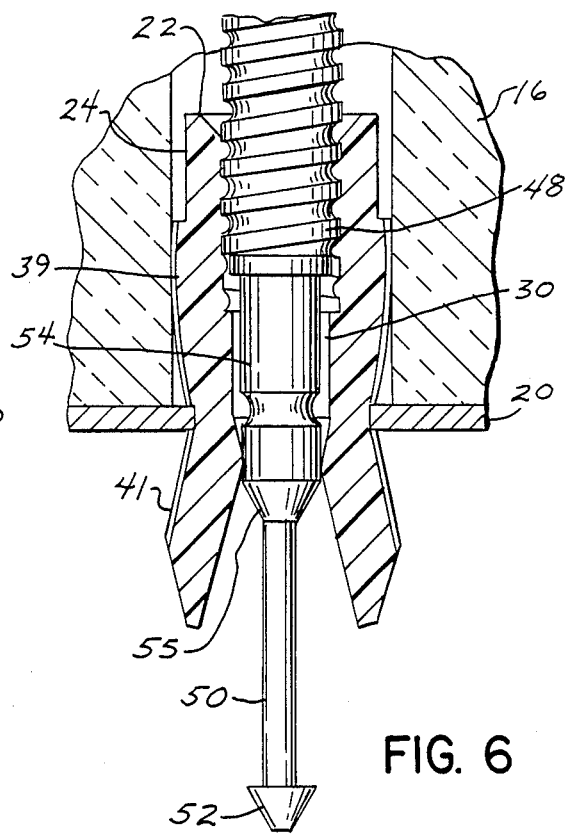
FIG. 6 is an enlarged cross-sectional view of the nut assembly of FIG. 5 shown during an initial phase of installation.
Figure 7:
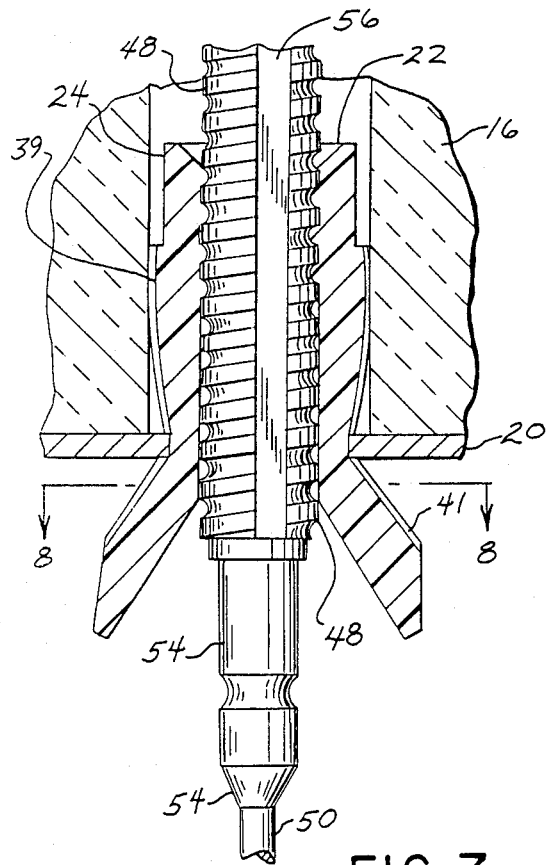
FIG. 7 is an enlarged cross-sectional view of the nut assembly of FIG. 5 shown completely installed.

As seen in FIGS. 5, 6 and 7, nut 12 includes an upper body portion 22 of reduced diameter and formed with a plurality of flat vertical surfaces 24.

Integral with and extending downwardly from upper body portion 22 are a plurality of resilient legs 26 which are formed by cutting slots 28 in the sidewall of nut 12. The inner walls of legs 26 define an upper circular passageway 30 having a diameter smaller than that of threaded hole 32 in upper body portion 22 and a lower passageway 34 having a diameter smaller than that of passageway 30. A tapered portion 36 connects passageway 30 with lower passageway 34.

The lower end 38 of legs 26 taper downwardly and inwardly to a point defining an exit hole 40 for lower passageway 34. The outer diameter of legs 26 is tapered so that when nut 12 is placed in pre-drilled hole 42 an upper portion 39 of legs 26 defining upper passageway 30 will remain above deck 20 and a lower portion 41 of legs 26 defining lower passageway 34 will be disposed below deck 20.

The use of resilient material in the manufacture of nut 12 combined with slots 28 allows legs 26 to resiliently move outwardly on experiencing the necessary force.

Bolt 14 is provided with an upper plate member 44 that engages the surface of membrane 18 and is provided with a tool engaging hole 46 which permits the rotation of bolt 14.

Threaded shank portion 48 is integral with and depends downwardly from plate member 44. Shank 48 is threaded along substantially its entire length so as to allow for the use of fastener assembly 10 with varying thicknesses of roofing materials.

Integral with and extending downwardly from threaded shank 48 is intermediate section 54 having a length slightly greater than that of upper passageway 30 and having a tapered bottom 55. Intermediate section 54 has a diameter less than that of upper passageway 30, but greater than that of lower passageway 34. During installation, tapered bottom 55 is seated in tapered portion 36 and communicates an outward force on lower leg portion 41 causing them to move outwardly and thus enhance the frictional fit between nut 12 and the sidewalls of pre-drilled hole 42.

Integral with and extending downwardly from intermediate section 54 is tip portion 50 which has a length greater than that of lower passageway 34 and which terminates in an enlarged head 52.

Tip portion 50 has a diameter slightly less than that of lower passageway 34 while enlarged head 52 has a cross-section greater than that of passageway 34. Enlarged head 52 is forced through passageway 34 causing legs 26 to flare outwardly. When enlarged head 52 exits through hole 40 legs 26 return to their original position and nut 12 is thus retained on tip portion 50 between shank 48 and head 52.

Figure 8:
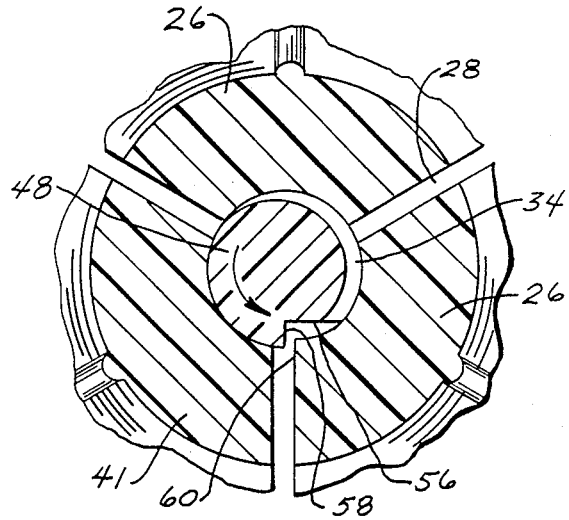
FIG. 8 is a sectional view taken along line 8—8 of FIG. 7.

As seen in FIGS. 7 and 8, threaded shank portion 48 is provided with a longitudinal groove 56. Groove 56 allows for clockwise rotation of bolt 14 but provides an interference surface 58 that engages a corner or edge 60 on the inner surface of leg 26 so as to prevent counterclockwise rotation of bolt 14. The interference can be overcome by an intentional and forceful counter rotation of bolt 14 by the interference is sufficient to prevent counter rotation of bolt 14 by mere vibrational or environmental forces.

The installation of fastener assembly 10 is best shown in FIGS. 1, 5, 6 and 7. As shown in FIG. 1, a hole 42 is pre-drilled through membrane 18, insulation 16 and roof deck 20.

As described above, nut 12 is retained on tip portion 50 of bolt 14 so that the entire assembly 10 may be inserted through pre-drilled hole 42.

Upon location of nut 12 into the hole in deck 20, a tool is utilized to rotate bolt 14 in a clockwise direction. The initial rotation of bolt 14 causes the seating of tapered bottom 55 of intermediate section 54 in tapered portion 36 causing lower leg portions 41 to flair slightly and enhance the frictional fit between nut 12 and hole 42. As shown in FIG. 6, as bolt 14 is further rotated, shank portion 48 engages reduced upper passageway 30 and causes upper leg portion 39 to bulge outwardly above the surface of deck 20. This bulge above deck 20 and within insulation 16 prevents rotation of nut 12 and further enhances the holding power of assembly 10. As seen in FIG. 7, continued rotation of bolt 14 causes shank portion 48 to engage lower passageway 34 resulting in further flairing of lower leg portions 41. The clockwise rotation of bolt 14 is continued until plate member 44 securely abuts membrane 18. The outward flaring of lower legs 41 prevents the removal of nut 12 and provides the entire assembly 10 with superior holding power.

Figure 9:
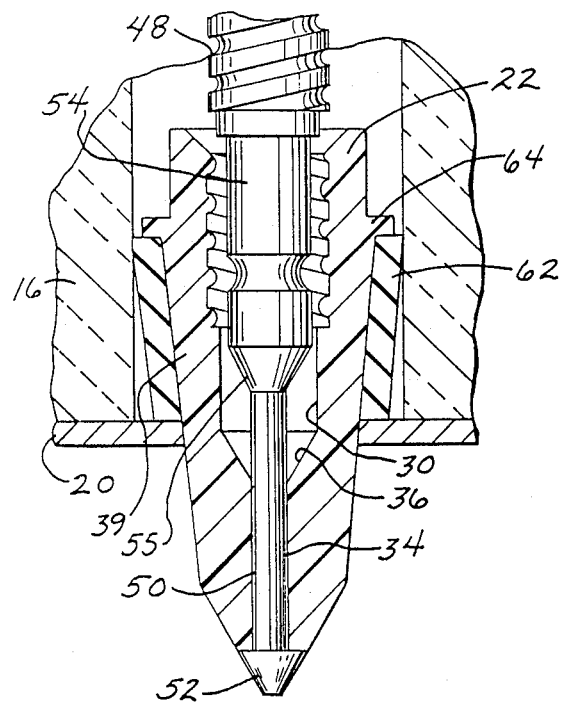
FIG. 9 is an enlarged cross-sectional view of alternate embodiment of the fastener assembly in the process of installation.
Figure 10:
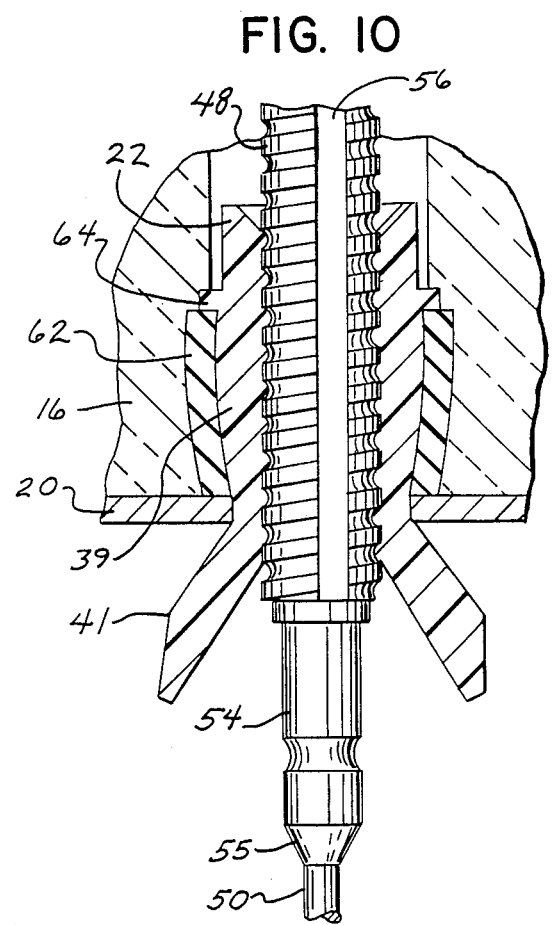
FIG. 10 is an enlarged cross-sectional view of the fastener assembly of FIG. 9 shown installed.

FIGS. 9 and 10 illustrate an alternate embodiment of fastener assembly 10 in which a sealing gasket or grommet 62 is provided on upper leg portion 39 of nut 12. Upper body portion 22 is provided with a flange or lip 64 which prevents upward movement of gasket 62. Gasket 62 is of a resilient material so that it may expand as upper leg portion 39 bulges during installation. Gasket 62 provides a seal at predrilled hole 42 so as to protect against leaks at that point.

Should it become necessary to remove fastener assembly 10, a tool can be utilized to provide counterclockwise rotational force on bolt 14. This force will overcome the interference between longitudinal groove 56 and leg edge 60 so that shank portion 48 may be withdrawn upwardly through reduced passageways 30 and 34. Once in this position, upward force can be applied on bolt 14 to remove it from hole 42. Enlarged head 52 will not pass through exit hole 40 and thus nut 12 will be retained on tip portion 50 and the entire assembly can be lifted from hole 42. Upon repair or replacement of the roofing materials, fastener assembly 10 can once again be utilized to secure the roofing materials to the roof deck.

Various modes for carrying out the invention are contemplated as being within the scope of the following claims particularly pointing out and distinctly claiming the subject matter which is regarded as the invention.

I claim:

1. A fastener assembly for securing layers of roofing material to a deck, said fastener comprising:
   a nut for insertion in and engagement with a hole drilled in the deck, said nut having;
   (a) an upper body portion and
   (b) a plurality of resilient legs depending downwardly from said upper body portion, said legs being tapered inwardly from top to bottom so that upon insertion of said nut in said hole an upper leg portion is disposed above the deck and a lower leg portion is disposed below the deck, said upper leg portion defining an upper passageway having a first diameter and said lower leg portion defining a lower passageway having a second diameter smaller than said first diameter, and
   a bolt for passage through said layers of roofing material and engagement with said nut, said bolt having,
   (a) an upper plate member for engagement with the surface of the uppermost layer of roofing material, said upper plate member provided with a tool engaging surface to permit rotation of said bolt, and
   (b) a shank portion connected to and depending from said plate member, said shank portion having an upper threaded portion having a diameter greater than those of both of said upper and lower passageways and an intermediate section extending downwardly from said upper threaded portion and having a diameter greater than that of said lower passageway, said intermediate section having a length slightly greater than said upper passageway so that upon insertion of said bolt into said nut, said intermediate section enters said lower passageway forcing said lower leg portion outwardly prior to the entry of said upper threaded portion into said upper passageway causing the outward bulging of said upper leg portion.

2. The fastener assembly defined in claim 1 further comprising detent means disposed on said shank portion and engageable with said nut to inhibit counter rotation of said bolt out of said nut.

3. The fastener assembly defined in claim 2 wherein said detent means comprises a groove running longitudinally along at least the lower portion of said upper threaded portion, with said groove engageable with an edge portion of said leg upon counter rotation of said bolt so that counter rotation of said bolt is inhibited by the abutment of said leg edge against said groove.

4. The fastener assembly defined in claim 1 further comprising a tip portion of said bolt, connected to and extending downwardly from said intermediate section, said tip portion having a length at least equal to that of said upper and lower passageways and having a reduced diameter so as to pass through said passageways without causing outward deflection of said upper and lower leg portion, the end of said tip portion provided with an enlarged head with said head having a diameter greater than that of said lower passageway and said head extending outwardly of said pasageway so that said nut is retained on said tip portion between said head and said upper threaded portion.

5. A fastener assembly for securing layers of roofing material to a deck, said fastener comprising:
   a nut for insertion in and engagement with a hole drilled in the deck, said nut having;
   (a) an upper body portion and
   (b) a plurality of resilient legs depending downwardly from said upper body portion, said legs beng tapered inwardly from top to bottom so that upon insertion of said nut in said hole an upper leg portion is disposed above the deck and a lower leg portion is disposed below the deck, said upper leg portion defining an upper passageway having a first diameter and said lower leg portion defining a lower passageway having a second diameter smaller than said first diameter, and a bolt for passage through said layers of roofing material and engagement with said nut, said bolt having,
   (a) an upper plate member for engagement with the surface of the uppermost layer of roofing material, said upper plate member provided with a tool engaging surface to permit rotation of said bolt,
   (b) a shank portion connected to and depending from said plate member, said shank portion having an upper threaded portion having a diameter greater than those of both of said upper and lower passageways and an intermediate section extending downwardly from said upper threaded portion and having a diameter greater than that of said lower passageway, said intermediate section having a length slightly greater than said upper passageway so that upon insertion of said bolt into said nut, said intermediate section enters said lower passageway forcing said lower leg portion outwardly prior to the entry of said upper threaded portion into said upper passageway causing the outward bulging of said upper leg portion, and a tip portion, connected to and extending downwardly from said intermediate section, said tip portion having a length at least equal to that of said upper and lower passageways and having a reduced diameter so as to pass through said passageways without causing outward deflection of said upper and lower leg portion, the end of said tip portion provided with an enlarged head with said head having a diameter greater than that of said lower passageway and said head extending outwardly of said pasageway so that said nut is retained on said tip portion between said head and said upper threaded portion.

* * * * *